Jan. 24, 1939. A. H. WOLFERZ 2,145,147
PHOTOELECTRIC MEASURING APPARATUS
Filed Sept. 22, 1934
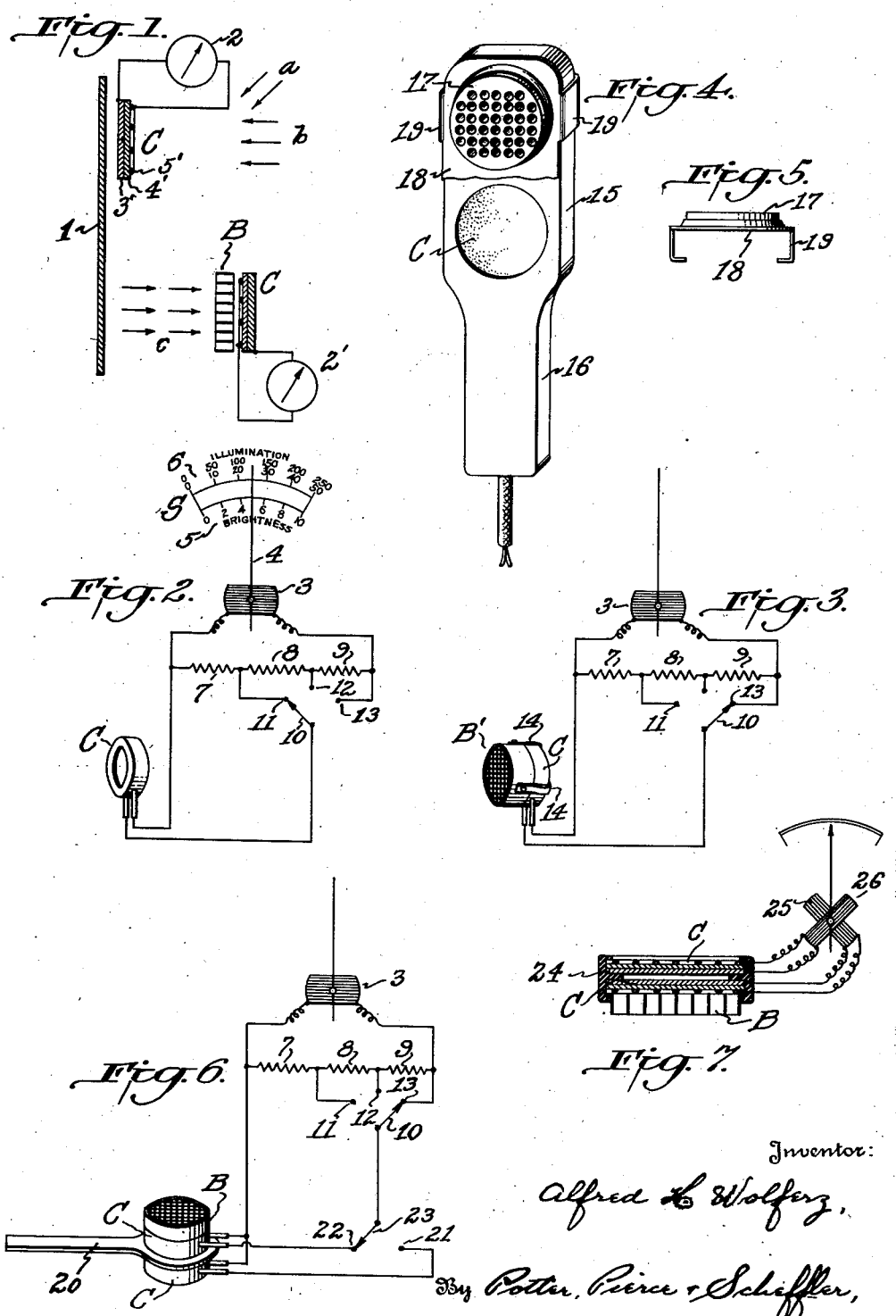

Patented Jan. 24, 1939

2,145,147

UNITED STATES PATENT OFFICE 2,145,147

PHOTOELECTRIC MEASURING APPARATUS

Alfred H. Wolferz, Hillside, N. J., assignor to Weston Electrical Instrument Corporation, Newark, N. J., a corporation of New Jersey Application September 22, 1934, Serial No. 745,130

8 Claims. (Cl. 88—23)

This invention relates to photoelectric measuring apparatus and more particularly to apparatus adapted for use in determining the reflection factor of a surface or area.

The reflection factor F of a surface under test may be defined by the equation:

$$F = \frac{\pi \text{ Brightness}}{\text{Illumination}}$$

The "illumination" at a given surface is a function of the total light rays which reach that surface and, obviously, a measurement of illumination should be made at or adjacent the surface under consideration and the measuring device should be influenced by all light rays which may reach the surface. On the other hand, the brightness of a surface is a quantity or value which must be measured at a point spaced from the surface, since brightness is dependent upon the property of the surface to reflect, to the point of observation, a portion of the total light rays incident upon the surface. A device for measuring brightness should therefore include some provision for restricting the effective light beam to those rays which come to the point of measurement from the surface under consideration.

Objects of this invention are to provide simple and efficient apparatus of the photoelectric type for determining the reflection factor or the values from which the factor may be computed. An object is to provide measuring apparatus including a measuring instrument and an exploring unit or photosensitive element which is adapted to be influenced, alternatively as desired by the operator, by all light rays which reach the exploring unit or by only those light rays which reach the exploring unit from a particular direction. A further object is to provide photoelectric measuring apparatus including a measuring instrument, an exploring unit including one or more photoelectric cells, and a detachable baffle or light-restricting element which may be placed over the photoelectric cells when brightness measurements are to be made. Another object is to provide photoelectric measuring apparatus including a measuring instrument of the double coil ratio meter type and an exploring unit having two photosensitive systems which respond, respectively, to illumination and to brightness, whereby the reflection factor may be directly indicated by the reading of the instrument.

These and other objects and the advantages of this invention will be apparent from the following specification when taken with the accompanying drawing in which, Fig. 1 is a schematic view illustrating the general design of systems for measuring, respectively, the illumination at and the brightness of a surface, Fig. 2 is a circuit diagram of photoelectric apparatus for measuring either illumination or brightness, the view illustrating the apparatus adjusted for an illumination measurement, Fig. 3 is a similar diagrammatic view of the apparatus adjusted for a brightness measurement, Fig. 4 is a perspective view of an exploring unit forming part of the apparatus shown diagrammatically in Figs. 2 and 3, a portion of the detachable baffle being broken away to show the light sensitive element.

Fig. 5 is an end elevation of the detachable baffle or light-restricting element, Fig. 6 is a diagrammatic view of an alternative construction which includes a double exploring unit and a switch for alternatively associating either element with the measuring instrument, and Fig. 7 is a diagrammatic view of apparatus for the direct measurement of the reflection factor, the double exploring unit being shown in section.

The invention will be described in connection with photoelectric devices of the current generating type but it will be apparent that the novel features and methods of the invention may be employed with photoelectric devices of the light-sensitive resistance or the phototube types.

In the drawing, the reference numeral 1 identifies a plate or sheet having a surface upon which light rays may impinge from various angles or directions, some of the light rays being indicated by the arrows a, b. Since the illumination of or at the surface is determined by the aggregate or summation of all rays which reach that surface, the value or magnitude of the illumination may be indicated by a measuring instrument 2 which responds to the output of a photoelectric cell C which is freely exposed to all light rays reaching the surface. As indicated somewhat diagrammatically, the cell C includes a back electrode 3', a layer of light sensitive material 4', such as selenium, a selenium-like material, cuprous oxide, etc., and an outer light transmitting electrode or grid 5'.

The brightness of the surface of plate 1 may be measured by a similar photoelectric system comprising a measuring instrument 2' and cell C when a baffle B or light-restricting element of cellular form is placed before the cell to restrict the beam of light reaching that cell to those rays, indicated by arrows c, which reach the cell from the surface under consideration.

The reflection factor of the surface may then be computed from the readings of instruments 2 and 2', but it is inconvenient and frequently impractical to use two complete measuring systems to determine the quantities from which the reflection factor may be computed.

As shown diagrammatically in Figs. 2 and 3, a single measuring instrument may be employed with a single exploring unit to measure either illumination or brightness when a detachable baffle B' is provided for use, as desired, with the photosensitive element C of the exploring unit. The measuring instrument may be a sensitive milliammeter of the type including a permanent magnet and a pivoted coil 3 which carries a needle or pointer 4. The needle is movable over a scale S that includes brightness graduations 5 and a set of illumination graduations 6. To adjust the instrument to the several sets of graduations, a shunt resistance and switch system is shunted across the moving coil 3, and includes serially connected resistors 7, 8, 9 and the switch arm 10 which may be adjustably positioned to engage switch contacts 11, 12, 13, respectively, that are connected to the joined terminals of elements 7, 8; 8, 9 and 9, 3, respectively. When the contact arm is positioned on contacts 11 or 12, the instrument will indicate the measured value, on the higher or lower illumination scales, of the illumination at the surface or area under consideration. When the arm 10 is adjusted to the contact point 13, the instrument will indicate brightness values on the graduated brightness scale 5. For the measurement of brightness values, the detachable baffle B' is clipped to the cell C of the exploring unit, as is indicated in Fig. 3. The baffle B' may be a short cylindrical sleeve within which crossed louvre members are fixed, the sleeve having spring clips 14 which are adapted to slip over the photoelectric cell unit C.

One practical form of an exploring unit and detachable baffle is illustrated in Figs. 4 and 5. The exploring unit is preferably formed of a molded synthetic material and includes a main portion 15 which houses a pair of photoelectric cells C of the current generating type and a handle portion 16 which is conveniently shaped to be held in the hand of the operator. The photoelectric cells are connected in parallel to increase the current input to the measuring instrument, but the number of and total current output of the cells may be varied to meet desired design conditions. The portion 15 of the exploring unit which houses the cells is of rectangular cross-section and the detachable baffle takes the form of a pair of short, multiple apertured cylinders 17 mounted upon a plate 18 which has depending clip fingers 19 that grip the lower face of the exploring unit.

In the form of the invention illustrated in Fig. 6, the measuring instrument, shunt resistors and switch system may be substantially as shown in Figs. 2 and 3, and corresponding parts are identified by reference numerals which appear in those views. The apparatus is characterized by a "double element" exploring unit which includes a pair of similar photosensitive elements C mounted on a handle 20, one unit being provided with a permanently attached baffle system B for restricting the effective light beam to those rays which are substantially normal to the outer electrode surface of the associated cell element C. Similar terminals of the pair of photosensitive cells C are connected to one side of the coil 3 of the measuring instrument, and the opposite terminals of elements C are connected to the fixed contacts 21, 22, respectively, for selective engagement by the switch arm 23 in accordance with the character of the measurement which is to be made. With switch contact arms 10, 23 in the positions indicated, the apparatus is properly set for brightness measurements. When switch arm 23 and contact 21 are engaged, and switch arm 10 is adjusted to contact points 11 or 12, illumination measurements may be made.

The reflection factor of a surface may be directly measured by the apparatus illustrated in Fig. 7. The exploring unit includes a double element device of the type shown in Fig. 6, i. e. a pair of cells C mounted in a frame or handle member 24, with one cell C provided with a permanently attached baffle B. The electrodes of the respective cells C are connected to the coils 25, 26 of a crossed coil or any other form of ratio meter instrument. The scale of the instrument may be directly graduated in terms of the reflection factor, and the value of that factor is determined by so positioning the exploring unit with respect to the surface under investigation that the unrestricted cell C is influenced by all light rays which reach that surface while the baffle associated with the other cell restricts the active light beam to those rays which reach the cell from the surface.

While the invention is particularly useful in measuring systems in which the photosensitive element is a cell or plurality of cells of the current generating type, it is obvious that certain advantages of the invention may be obtained with other types of photosensitive elements. The design of the component parts of apparatus embodying the invention is therefore susceptible to considerable variation and it is apparent that, except as limited by the following claims, the invention is not restricted to the apparatus herein illustrated and described. The nature and shape of the means employed to limit the angular spread of the light beam for brightness measurements may be varied within wide limits and the term "baffle" is to be understood as including mechanical and/or optical systems for restricting the angular spread. While it is convenient to adjust the sensitivity of the measuring instrument when shifting from illumination to brightness measurements, it is obvious that the measuring instrument may include a moving system of constant sensitivity when the instrument is provided with appropriate scales of illumination and brightness graduations, and the change from measuring brightness to measuring illumination is accomplished by the use of the removable baffle.

I claim:

1. In photoelectric apparatus adapted to determine the reflection factor of a surface, the combination with a measuring instrument having a scale carrying graduations of illumination and of brightness values, an exploring unit including a photosensitive element having an electrode adapted to receive light rays from divergent angles, and circuit connections between said photosensitive element and said measuring instrument, whereby illumination value may be measured by said photosensitive element and instrument when using the illumination units scale, of a light-restricting baffle including means for detachably connecting the same to said exploring unit to overlie said photosensitive element, whereby brightness values may be measured on the brightness units scale when said baffle is used with the photosensitive element.

2. Apparatus as claimed in claim 1, wherein said instrument includes a series of resistors in shunt to the moving coil of said instrument, and switch means for selectively controlling the effective value of the resistance in shunt to said moving coil.

3. In photoelectric apparatus, a measuring instrument including a moving system having a coil and a pointer carried thereby, and a scale over which said pointer is moved in accordance to current flow through said coil, said scale including a plurality of sets of illumination graduations and of sets of brightness graduations, a system of shunt resistances and switch means for controlling the sensitivity of said moving system, an exploring unit including a photosensitive element connected to said moving coil, and detachable baffle means adapted to be secured to said exploring unit to overlie said photosensitive element when brightness measurements are to be made using the brightness graduations and to be removed when illumination measurements are to be made using the illumination graduations.

4. In a double purpose photoelectric measuring apparatus, the combination with a barrier layer type photoelectric cell, a casing supporting said cell and exposing the same to light rays approaching over a solid angle of the order of $2\pi$ steradians, and a measuring instrument connected to said cell and having a scale graduated both in illumination units and in brightness units, of a light-restricting member, and means for detachably securing said member to said cell casing to restrict the angular spread of the light rays reaching said cell to those approaching from a region whose average brightness is to be determined, whereby illumination values may be read upon the scale of illumination units when the light-restricting member is removed from the casing and brightness values may be read upon the scale of brightness units when the light-restricting member is secured to the casing.

5. In a photoelectric measuring apparatus, the combination with a barrier layer type photoelectric cell, a housing carrying said cell and having an opening exposing the cell to light rays approaching over a relatively large solid angle, and a measuring instrument connected to said cell and including a pointer displaceable in accordance with changes in the magnitude of the light energy reaching the cell, of means for restricting the angular spread of the light rays that reach the cell to a substantially smaller solid angle; said restricting means comprising a light-restricting member movable with respect to said housing, and means for supporting said member upon said housing in position to restrict the angular spread of the light rays whereby the average intensity of the light energy approaching the cell over two substantially different solid angles may be indicated by said instrument.

6. In photoelectric measuring apparatus, the combination with a barrier layer type photoelectric cell, a housing supporting said cell and exposing the same to light rays approaching over a relatively large solid angle, and a measuring instrument connected to said cell and having a scale graduated in relative magnitudes of light energy arriving at said cell over said large solid angle, of a light-restricting member separate from said housing, and means for detachably connecting said member to said housing, to restrict the light rays reaching said cell to a substantially smaller solid angle, said instrument having a second scale graduated in relative magnitudes of light energy reaching said cell over the smaller angle.

7. In photoelectric apparatus for photometric measurements, the combination with a measuring instrument having a scale carrying graduations of illumination and of brightness values, a photoelectric cell connected to said instrument, and a housing for said cell and including means for admitting thereto light rays that approach the housing and cell over a wide solid angle, thereby to energize said instrument in accordance with the illumination at the cell, of a light-restricting member separate from and adapted for detachable connection to said housing to restrict the light rays reaching the cell to those that approach from a relatively restricted area, and means for securing said member to said housing, whereby said instrument is energized in accordance with the average brightness of the restricted area when said member is secured to said housing.

8. In photoelectric apparatus, the invention as claimed in claim 5, in combination with means manually adjustable to vary the sensitivity of the measuring instrument with respect to the magnitude of the light energy to be measured.

ALFRED H. WOLFERZ.